United States Patent
Westwater

(10) Patent No.: US 7,129,987 B1
(45) Date of Patent: Oct. 31, 2006

(54) METHOD FOR CONVERTING THE RESOLUTION AND FRAME RATE OF VIDEO DATA USING DISCRETE COSINE TRANSFORMS

(76) Inventor: Raymond John Westwater, 475 Wall St., Princeton, NJ (US) 08540

( * ) Notice: Subject to any disclaimer, the term of this patent is extended or adjusted under 35 U.S.C. 154(b) by 656 days.

(21) Appl. No.: 10/612,805

(22) Filed: Jul. 2, 2003

(51) Int. Cl.
*H04N 7/01* (2006.01)

(52) U.S. Cl. ...................................... 348/441

(58) Field of Classification Search ............... 348/441, 348/448, 452, 453, 459, 458, 581
See application file for complete search history.

(56) References Cited

U.S. PATENT DOCUMENTS

| | | | |
|---|---|---|---|
| 5,122,873 A * | 6/1992 | Golin | 375/240.23 |
| 5,563,660 A | 10/1996 | Tsukagoshi | |
| 5,657,082 A | 8/1997 | Harada et al. | |
| 6,141,017 A | 10/2000 | Cubillo et al. | |
| 6,157,396 A * | 12/2000 | Margulis et al. | 345/506 |
| 6,229,570 B1 | 5/2001 | Bugwadia et al. | |
| 6,356,315 B1 * | 3/2002 | Chen et al. | 348/581 |
| 6,377,621 B1 | 4/2002 | Borer | |
| 6,442,201 B1 | 8/2002 | Choi | |
| 6,452,639 B1 | 9/2002 | Wagner et al. | |
| 6,456,663 B1 * | 9/2002 | Kim | 375/240.25 |
| 2001/0024515 A1 | 9/2001 | Martins et al. | |
| 2001/0055340 A1 | 12/2001 | Kim et al. | |
| 2002/0009225 A1 | 1/2002 | Takahashi et al. | |
| 2002/0036705 A1 | 3/2002 | Lee et al. | |
| 2002/0085114 A1 | 7/2002 | Ojo et al. | |
| 2002/0136293 A1 | 9/2002 | Washino | |
| 2002/0136308 A1 | 9/2002 | Le Maguet et al. | |
| 2002/0136446 A1 | 9/2002 | Slavin | |
| 2002/0141501 A1 | 10/2002 | Krishnamachari | |

OTHER PUBLICATIONS

Borko Furht, Joshua Greenberg, and Raymond Westwater, Motion Estimation Algorithms for Video Compression, Kluwer Academic Publishers, 1997, pp. 1-27, 105-126.
Raymond Westwater and Borko Furht, Real Time Video Compression, Techniques and Algorithms, Kluwer Academic Publishers, 1997, pp. 1-21, 37-51.
K. R. Rao and P. Yip, Discrete Cosine Transform, Academic Press, Inc., 1990, pp. 1-38.
Georgi Tolstov, Fourier Series, Dover Publications, Inc., 1962, pp. 66-96.
Joan L. Mitchell, William B. Pennebaker, Chad E. Fogg, and Didier J. Legall, MPEP Video Compression Standard, Chapman and Hall, 1996.

* cited by examiner

*Primary Examiner*—Paulos M. Natnael
(74) *Attorney, Agent, or Firm*—Norman Friedland

(57) ABSTRACT

The resolution, in terms of numbers of pixels in horizontal and vertical directions, and frame rate, in terms of frames per second, of video data are converted by assembling a group of the frames within an input buffer, by applying a direct DCT to data from each line of pixels extending along a scan line and among scan lines, perpendicular to the scan lines, and to a line of pixels extending at each pixel position among the group of frames, and by applying an interpolating inverse DCT to coefficients generated by the direct DCT. Preferably, to prevent the formation of artifacts, the application of the direct DCT to data from a line of pixels is interrupted when a difference in a coordinate data value between adjacent pixels exceeds a threshold limit.

22 Claims, 7 Drawing Sheets

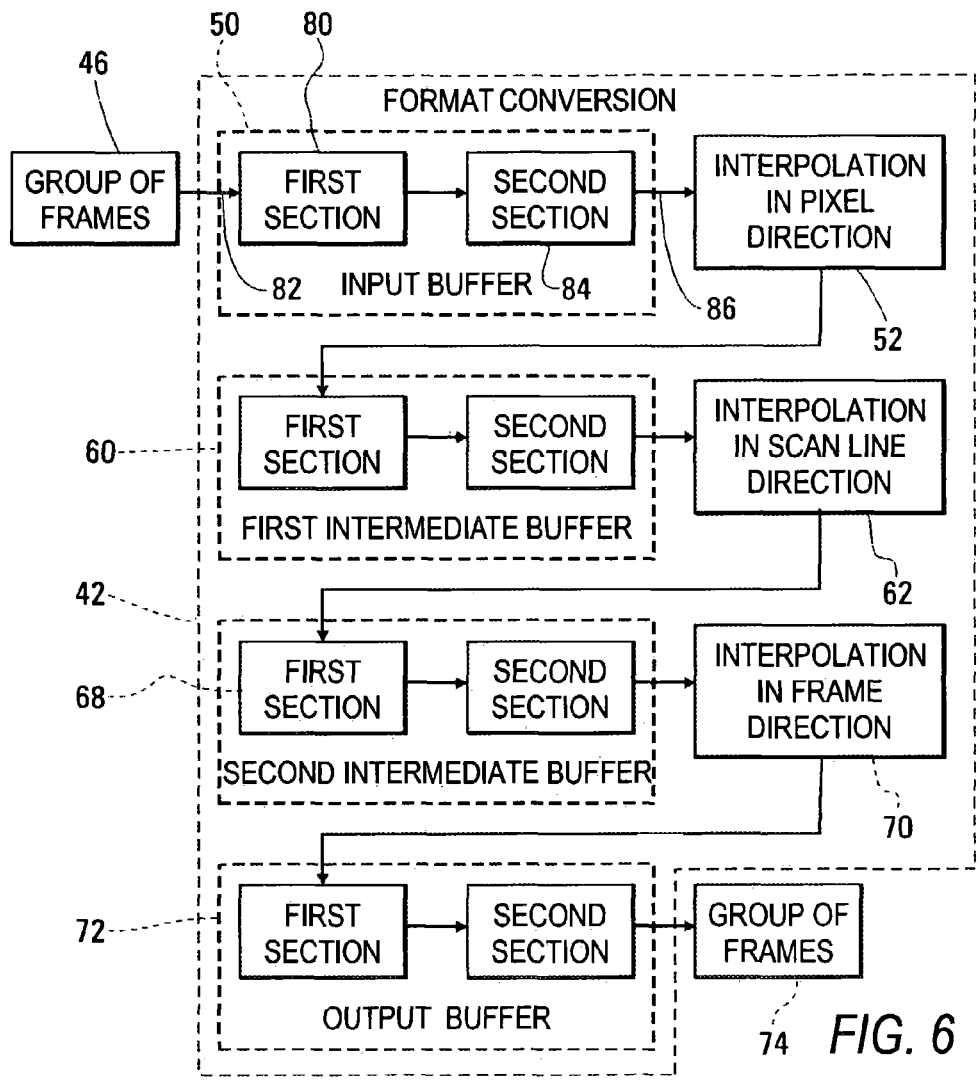
FIG. 6
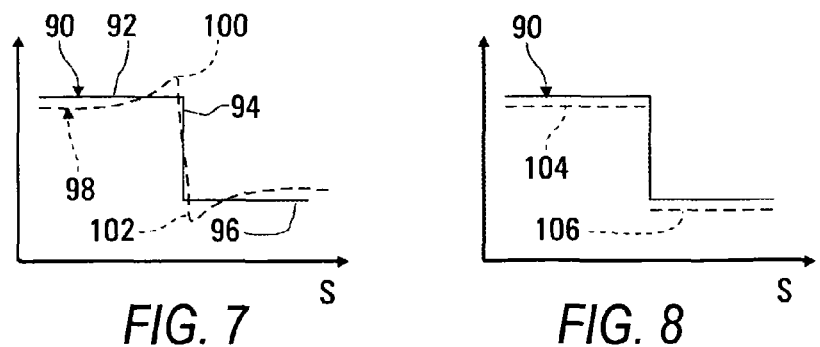
FIG. 7
FIG. 8

METHOD FOR CONVERTING THE RESOLUTION AND FRAME RATE OF VIDEO DATA USING DISCRETE COSINE TRANSFORMS

FEDERALLY SPONSORED RESEARCH

Not Applicable.

BACKGROUND

1. Field of Invention

The present invention relates generally to enlarging two- and three-dimensional digital data arrays representing physical entities, and more particularly to the application of the Discrete Cosine Transform (DCT) as an interpolation function for video data. This invention has application in the up-conversion or down-conversion of video formats, i.e., for the purpose of HDTV format conversion.

2. Description of Prior Art

The use of mathematical functions for the purpose of up-sampling (interpolation) to increase a number of data points and for down-sampling to reduce a number of data points is well-known. Examples of the use of such functions will now be explained with reference to FIGS. 1–3.

FIG. 1 is a data flow chart showing the conventional application of the average function, which is perhaps the simplest interpolation function, to data points 10 described by formulas 12 forming new data points 14, described by formulas 16. Each of these new, intermediate data points has a value that is the average of the adjacent data points. Many additional filters having special properties (blurring, sharpening, contrast enhancement, etc.) have been described in the literature.

It is well established in the literature of the field of video compression that video can be well-modeled as a stationary Markov-1 process. This statistical model predicts the video behavior quite well, with measured correlations as high as 0.99 in the frame direction.

It is also well-known the Karhunen-Loeve Transform (KLT) perfectly decorrelates Markov-distributed video. This means the basis of the KLT is an independent set of vectors which encode (i.e., predict) the pixel values of the video sequence.

It is a further result that many discrete transforms well approximate the KLT for large correlation values. Perhaps the best-known such function is the DCT, although many other functions (DST, WHT, etc.) serve as reasonable approximations to the KLT.

If a discrete transform that approximates the KLT representation is considered a continuous function, that function ideally approximates the video in that each of the independent basis functions predicts video values smoothed at the sampling rate of the original video. Thus the sampled IDCT (or polynomially-fit IKLT coefficients, IDST, or other continuous approximation to the inverse KLT) forms an optimal filter for prediction of interpolated pixel values.

The patent literature includes a number of patents and publications describing methods for using interpolation functions to expand an image array in the horizontal and/or vertical directions. For example, U.S. Pat. No. 6,141,017 to Cubillo et al. describes a method and apparatus using data interpolation to provide a scaled expanded image array of an original image array representing a physical entity, such as an image or sequence of frames, by utilizing fractal transform methods. Fractal transform methods are used to select a best domain/range block correspondence in an original image array, with the range block being larger than the domain block. A subset of the data values in the range block is selected. Finally, an area of the expanded image array is populated with the data values in the selected subset where the area corresponds to the domain block location in the original image array.

U.S. Pat. App. Pub. No. 2002/0136293 to Washino describes a multi-format digital video production system enabling a user to process an input video program to produce an output video of the program in a final format, which may have a different frame rate, pixel dimensions, or both. In the preferred embodiment, specialized graphics processing capabilities are included in a high-performance personal computer or workstation. Images are resized horizontally and vertically by pixel interpolation. Frame rates are adapted by inter-frame interpolation, or by traditional schemes.

U.S. Pat. No. 6,356,315 to Chen et al. describes a method for achieving magnification or reduction by a single FIR filter under the control of a DDA (digital differential amplifier) as would be used to simulate a perfectly straight line on a two-dimensional raster. The single FIR filter combines the processes of interpolation, filtering, and decimation. The DDA is programmed with the desired magnification or reduction ratio to provide signals that control shifting of input samples into the FIR filter and selection of FIR coefficients for the FIR filter.

U.S. Pat. App. Pub. No. 2002/01364446 to Slavin describes a system and method for producing a resampled image from a source image by solving coefficients for a cubic polynomial transition model.

U.S. Pat. App. Pub. No. 2002/0009225 to Takahashi et al. describes a resolution conversion method in which an image signal expressing pel (pixel) values and a significance signal indicating whether the pel is significant are supplied as input signals.

By referring to the input significance signal values for the pels proximal to the pel being processed, the significant pels are identified, and a resolution conversion characteristics selector selects one of two or more frequency conversion characteristics to be used for resolution conversion of the image signal using only significant pels.

U.S. Pat. App. Pub. No. 2001/0024515 to Martins, et al. describes a method and apparatus to interpolate video frames, in which the method comprises, for a plurality of interpolated pixels in an interpolated video frame, classifying an interpolated pixel of the plurality as one of stationary, moving, covered, and uncovered, and then setting components of the interpolated pixel in components of a previous pixel from a previous video frame, the previous pixel corresponding to the interpolated pixel in the video frame.

U.S. Pat. No. 5,657,082 to Harada et al. describes an imaging apparatus capable of outputting video signals. The imaging apparatus includes: a color separating optical system for separating incident image light into light beams of primary colors; first, second, and third imaging portions respectively including a first, second, and third set of pixels arranged at regular pitches in a first direction and in a second direction which is perpendicular to the first direction, the first, second, and third imaging portion receiving each one of the light beams of the primary colors and respectively accumulating them in the first, second, and third set of pixels, as the image signal, the first set of pixels being shifted by ½ pitch with respect to the second and third set of pixels in the first direction and the second direction; an A/D converter for converting the image signals of primary colors accumulated in the first, second, and third sets of pixels into digital signals; an interpolation processor for performing interpolation processing to the image signals of the primary colors which are converted into the digital signals in the A/D conversion, thereby doubling the number of pixels in the second direction; and a pixel number converter for converting the image signals of primary colors which are interpolated in the interpolation processor into image signals based on any one of the plurality of formats.

A number of other patents describe methods for interpolating the movements of visual objects occurring among frames of data to increase the number of frames per second in moving video data. For example, U.S. Pat. No. 6,229,570 to Bugwadia et al. describes a process for up-converting an existing video source signal having a low frequency, in frames per second, to a high frequency signal for use with HDTV (high definition television). The process samples the existing frames in the existing video signal and calculates integer displacements of pels (pixels) within the existing frames. A polynomial curve fit is then performed on the displacements to obtain estimates of horizontal and vertical displacements of each block in each existing frame. Based on the alignments of the blocks within a sampling grid on each frame, the blocks are segregated into groups. The block groups are then used to interpolate missing or required frames of the high frequency signal in a piecemeal manner by utilizing blocks of a particular block group to estimate a corresponding block of the high frequency signal.

U.S. Pat. No. 6,377,621 to Borer describes a method for performing improved motion compensated interpolation of moving images using motion vectors of variable reliability. By taking into account the reliability of the motion vectors, produced by a separate motion estimation device, a subjectively pleasing interpolation can be produced. The method allows a gradual transition between motion compensated and non-motion compensated interpolation depending on the reliability of the motion vector used. This is achieved by modifying the temporal interpolation timing, using a look up table, controlled by a vector reliability signal produced by the motion estimator.

U.S. Pat. No. 6,452,639 to Wagner et al. describes a method and system for converting from interlaced to progressive video frames, using an interpolation algorithm that is scalable, having several levels or modes with an increasing computational complexity, depending on the level of resources available for the conversion process.

U.S. Pat. App. Pub. No. 2000/085114 to Ojo, et al. describes a processing circuit for removing interlacing from video signals. The processing circuit comprises a line memory, a de-interlacing circuit, a frame memory, and a cache memory, in which a pixel mixer is interposed between the cache memory and the de-interlacing circuit.

U.S. Pat. App. Pub. No. 2002/0036705 to Lee et al. describes a format converter and method that performs frame-rate conversion and de-interlacing using a bi-directional motion vector. The method includes steps of (a) estimating a bi-directional motion vector between the current frame and the previous frame from a frame to be interpolated; (b) setting the motion vector of a neighboring block that has the minimum error distortion, among motion vectors estimated in step (a); and (c) forming a frame to be interpolated with the motion vector set in step (b).

What is needed is a method applying the same simple process to change both the format of video data, in horizontal and vertical directions, and for varying the frame rate of the video data.

FIG. 2 is a data flow chart showing the application of a first conventional sampling technique for down-sampling to reduce the number of data points 20 described by formulas 22, with intermediate data points are discarded to form data points 24 described by formulas 26.

FIG. 3 is a data flow chart showing the application of a second conventional sampling technique to reduce the number of data points 20 described by formulas 22, with adjacent pairs of values being averaged to form single data points 28 described by formulas 30.

The DCT (discrete cosine transform) is a mathematical transform that is widely used in the compression of still video images to simplify their transmission and storage both for use as still images and for use as portions of motion images. In particular, the DCT is used in the JPEG (Joint Photographic Experts Group) standard for digital compression, which is the most popular method for digital compression of still images, with the DCT transform being easily implemented in both software and hardware.

The JPEG video compression process begins with subdividing a video image into a number of macroblocks, each of which includes 64 pixels from an 8×8 square block of the original image. Each of these macroblocks is then sent into the DCT-based encoder portion of the compression routine, with a functional unit called the FDCT (forward discrete cosine transform) receiving the macroblock to apply a transform to the pixels therein. The transformed data is then sent to a quantizer, which performs the first stage of compression in which data is lost. The compressed data is then sent to an entropy encoder, in which a coding system such as Huffman coding is applied. Finally, the data is converted into a bit stream for storage or for immediate transmission.

The JPEG decompression technique is symmetrical with the compression technique, applying inverse processes to reverse the processes previously applied. The process begins with an entropy decoder, which undoes the process performed by the entropy encoder. Data from the entropy decoder moves to a dequantization stage, and, then, to a stage applying an IDCT (inverse discrete cosine transform) process to reverse the FDCT process applied during compression.

A Motion JPEG (M-JPEG) compression technique is an extension of the JPEG technique to handle moving pictures, with each frame in a video sequence being individually compressed using JPEG. Like JPEG, M-JPEG attains compression ratios of 10:1 to 15:1.

The MPEG (Motion Picture Experts Group) uses a much more complex technique to attain compression ratios of 30:1, with some frames in a sequence being encoded as I frames (intra frames), which are self contained, being encoded using a DCT-based technique similar to JPEG. Other frames are encoded as P frames (predicted frames) using forward predictive coding, in which the actual frame is coded with reference to a previous I or P frame. Other frames are encoded as B frames (bidirectional or interpolated frames) that are coded using a past frame and a future frame, which may be I or P frames, as reference frames.

The patent literature further includes a number of patents describing systems and methods for improving the implementation of IDCT transforms to decompress video input signals transmitted according to the MPEG standard, and particularly to decompress such input signals to provide variations in the resolution and frame rate of the resulting video signals. For example, U.S. Pat. No. 5,563,660 to Tsukagoshi describes an apparatus for expanding a compressed digital video signal representing a motion picture to provide a digital video output signal. The apparatus includes a decoder for the compressed digital video signal using a common memory for decoding and for a ⅔ pull-down conversion of the reconstructed interlaced frames stored in the frame memory with a frame rate of 24 Hz to provide the pictures of the digital video output signal with a picture rate of at least 49 Hz.

U.S. Pat. App. Pub. No. 2002/0136308 to La Maguet et al. describes a method for generating a down-sampled video from an input coded video coded according to a block-based technique and comprising quantized DCT coefficients defining DCT blocks. The down-sampled video is composed of frames having a smaller format than the frame used to produce the input coded video.

U.S. Pat. No. 6,442,201 to Choi describes a down-conversion decoding device of a digital television producing a high-quality video image from a coded video signal with a reduced-size memory.

U.S. Pat. App. Pub. No. 2002/0141501 to Krishnamachari describes a system that increases a resolution of at least a portion of reference frame of video based on pixels in the reference frame and pixels in one or more succeeding target frames of the video. In the particular case of MPEG-coded video, blocks in the target frames are located using motion vector information present in the MPEG bit stream. Values of additional pixels are determined based on values of pixels in the first block and on values of pixels the one or more blocks, whereafter the additional pixels are added among the pixels in the first block in order to increase the block's resolution.

U.S. Pat. No. 6,456,663 to Kim describes a DCT-domain down conversion system that compensates for an IDCT mismatch to reduce aliasing. In the conversion system, a DCT domain filter is applied to the unquantized DCT coefficient values, and IDCT mismatch control processing is implemented. The DCT domain filter sets the filter coefficient corresponding to the highest frequency band to unity to prevent modification of any coefficient value that has been modified by the IDCT mismatch operation.

U.S. Pat. App. Pub. No. 2001/0055340 to Kim et al. describes an HDTV down conversion system including an apparatus for forming a low-resolution, 2:1 down converted video signal from an encoded video signal representing a video image, with the encoded video signal being a frequency-domain transformed high-resolution video signal with motion prediction.

The DCT is used because it predicts a representation of data that mirrors the statistical behavior of video data. This means that the interpolated data is that which, on the average, would have been present in typical video images. The synthesized higher-resolution image is therefore more accurate than that of any other filter. What is needed is a simple method using the DCT to produce a change both in the resolution of individual frames of video data and in the frame rate at which frames of video data are presented.

SUMMARY OF THE INVENTION

In accordance with one aspect of the invention, a method is provided for converting initial digital video data having a format including an input sequence of pixels extending in a first direction at a first spacing into output digital video data having a format including an output sequence of pixels extending in the first direction at a second spacing, different from the first spacing. The method includes a first step of transforming coordinate values of a first sequence of pixels within the input sequence of pixels into a first transformation function by applying a decorrelating transform to the coordinate values of the first sequence of pixels, wherein applying the decorrelating transform to the coordinate values of the first sequence of pixels removes a statistical correlation between coordinate values of sequentially adjacent pixels within the first sequence of pixels. The method also includes a second step of determining coordinate values for generating a second sequence of pixels forming a portion of the output sequence of pixels by evaluating, at locations of pixels sequentially adjacent in the first direction at the second spacing, a function formed by applying an inverse of the decorrelating transform to the first transformation function.

This method is used for converting a sequence of initial digital video frames having an initial format into a sequence of output digital video frames having an output format, different from the first format. The first format includes a first pixel spacing between adjacent pixels along scan lines, a first line spacing between adjacent scan lines, and a first frame spacing between adjacent frames, while the second format includes a second pixel spacing between adjacent pixels along scan lines, a second line spacing between adjacent scan lines, and a second frame spacing between adjacent frames. The steps of this method are applied to an input sequence of pixels extending along each scan line within each frame of the initial digital video frames. Then, a first intermediate sequence of digital video data is generated, including scan lines of pixels generated from the coordinate values determined by the method. This first intermediate sequence of digital video data may be used as the sequence of output digital video frames having a pixel spacing along each scan line which is different from the pixel spacing of the sequence of initial digital video frames.

Alternately, the steps of this method are then applied to each input sequence of pixels extending perpendicular to the scan lines within each frame of the first intermediate sequence of digital video data. Then, a second intermediate sequence of digital video data is generated, including scan lines of pixels generated from the coordinate values determined by the method. This second intermediate sequence of pixels may be used as the sequence of output digital video frames having a pixel spacing along each scan line that is different from the pixel spacing of the sequence of initial digital video frames, and additionally having a spacing between scan lines that is different from the scan line spacing of the sequence of initial digital video frames.

Alternately, the steps of this method are then applied to each input sequence of pixels extending perpendicular the frames through each frame of the first intermediate sequence of digital video data. Then, the output sequence of digital video data is generated, including scan lines of pixels generated from the coordinate values determined by the method. This output sequence of digital video data has a format with a pixel spacing that is different from the pixel spacing of the sequence of initial digital video frames, with a spacing between scan lines that is different from the scan line spacing of the sequence of initial digital video frames, and with a spacing between frames that is different from the frame spacing of the sequence of initial digital video frames.

This method may additionally include:

separating the input sequence of pixels into the first sequence of pixels and an additional sequence of pixels at a location corresponding to a visible discontinuity within the input sequence of pixels;

transforming coordinate values of the additional sequence of pixels into a second transformation function by applying the decorrelating transform to the coordinate values of the additional sequence of pixels; and determining coordinate values for a third sequence of pixels forming a portion of the output sequence of pixels by evaluating, at locations of pixels sequentially adjacent in the first direction at the second spacing, a function formed by applying an inverse of the decorrelating transform to the additional transformation function.

Alternately, this method may additionally include:

locating a visible discontinuity within the input sequence of pixels;

generating a leveling function to subtract from coordinate values of the input sequence of pixels to remove the visible discontinuity;

subtracting the leveling function from coordinate values of the input sequence of pixels to form the input function; and adding the leveling function to the coordinate values determined by evaluating the function formed by applying an inverse to the decorrelating transform to the first transformation function.

BRIEF DESCRIPTION OF THE DRAWINGS

FIG. 6 is a data flow chart of processes occurring during the format conversion if FIG. 5;

FIG. 7 is a graphical view of data values resulting from sampling adjacent pixels in a typical video sequence;

FIG. 8 is a graphical view of values formed by the separate application of a transform process to gradually changing regions of video data in the sequence of FIG. 7;

DETAILED DESCRIPTION OF THE PREFERRED EMBODIMENTS

Figure 1:
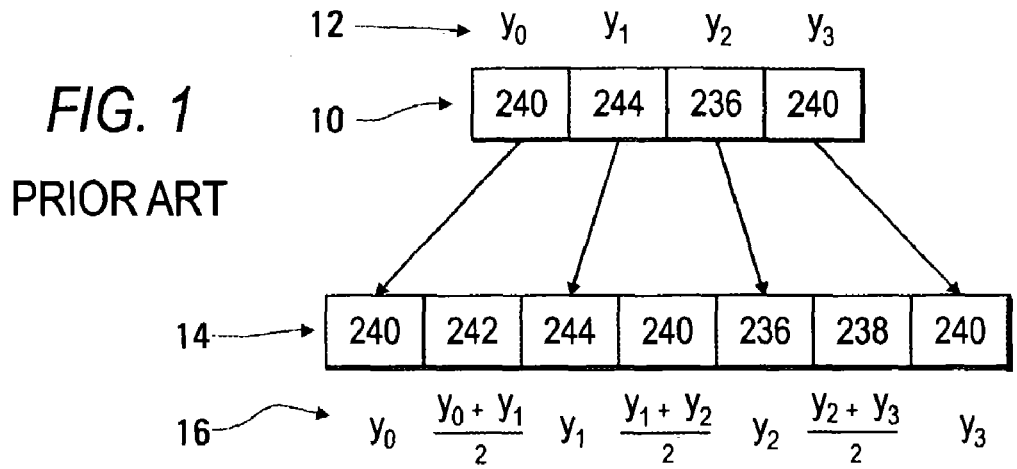
FIG. 1 is a data flow chart showing the conventional application of the average function.
Figure 2:
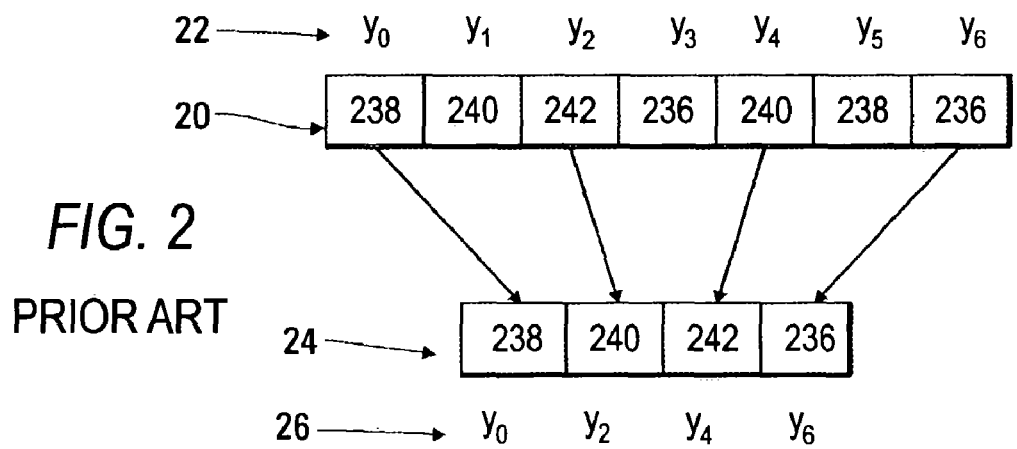
FIG. 2 is a data flow chart showing the application of a first conventional sampling technique for down-sampling to reduce the number of data points.
Figure 3:
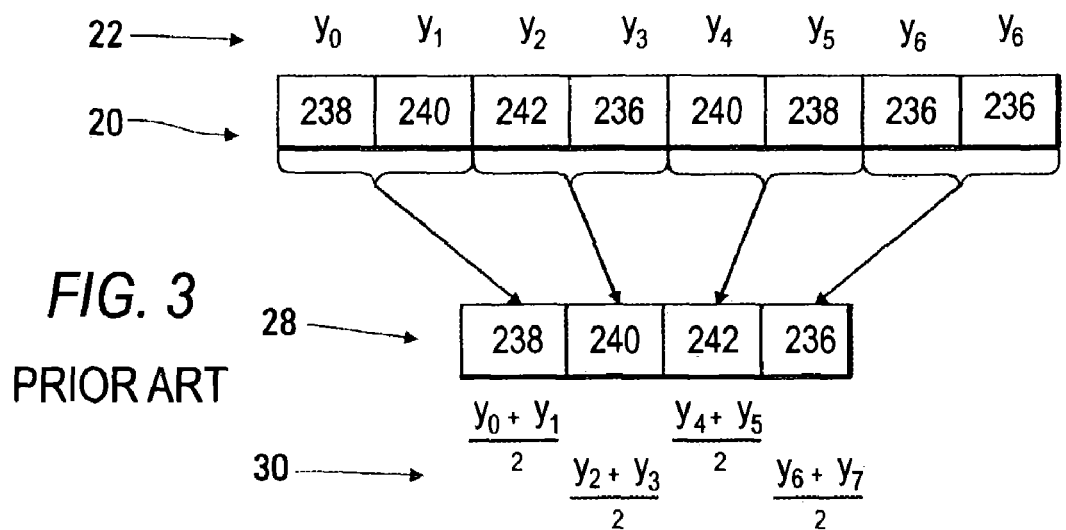
FIG. 3 is a data flow chart showing the application of a second conventional sampling technique for down-sampling to reduce the number of data points 20.
Figure 4:
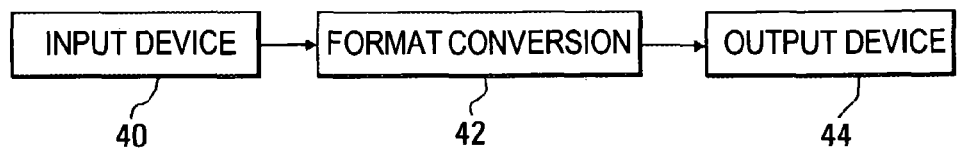
FIG. 4 is a block diagram of a system operating in accordance with a preferred embodiment of the invention.

FIG. 4 is a block diagram of a system operating in accordance with a preferred embodiment of the invention, with video data being driven from an input device 40 through a format conversion process 42 to an output device 44. Within the format conversion process 42, the format of the video data is changed from an input format to a desired output format.

Figure 5:
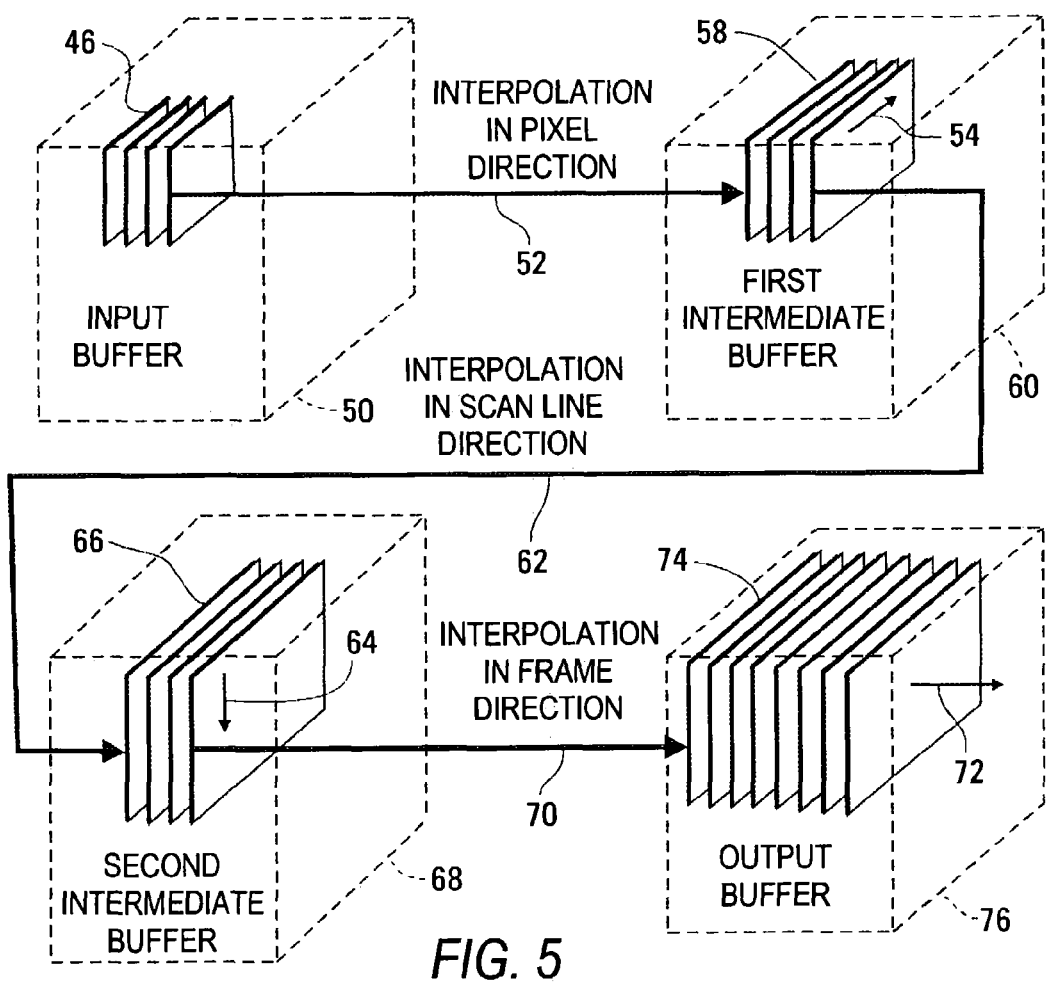
FIG. 5 is a pictographic view of a format conversion process occurring within the system of FIG. 4.

FIG. 5 is a pictographic view of the format conversion process 42 of FIG. 4. In accordance with a preferred version of the invention, this process is applied to a group of frames 46 received from the input device 40 within an input buffer 50. First, a process 52 of interpolation in the pixel direction of arrow 54, along a scan line between adjacent pixels, is applied to form a group of frames 58 stored within a first intermediate buffer 60. Next, a process 62 of interpolation in the scan line direction of arrow 64, i.e. in the direction between adjacent scan lines, is applied to form a group of frames 66 stored in a second intermediate buffer 68. Finally, a process 70 of interpolation in the frame direction of arrow 72, between sequentially adjacent frames, is applied to generate a group of frames 74 stored within an output buffer 76. Interpolation in the frame direction occurs between pixels at identical locations in frames within the group of frames 68.

In the example of FIG. 5, the number of data points, or pixels, is enlarged in both the pixel direction of arrow 54 and in the scan line direction of arrow 64. Such a modification of video data may be made, for example, to convert data from a standard format to a high definition format. Additionally, the number of frames may be increased or reduced through interpolation in the frame direction. This type of change may be made to accommodate a display system operating at a different frame rate, to make corrections necessary when converting from a display system using interlacing to a display system without interlacing or to slow down or speed up the apparent motion of an activity being displayed. Alternately, the interpolation process of the invention may be applied in only one or two directions, either to increase or decrease the number of pixels in the direction(s). For example, only the frame rate may be changed by interpolation in the frame direction, or the aspect ration (of picture width to height) may be changed by interpolation in either the pixel direction or the scan line direction.

FIG. 6 is a data flow chart of processes occurring during the format conversion process 42 of FIGS. 4 and 5. Preferably, the input buffer 50, the first intermediate buffer 60, the second intermediate buffer 68, and the output buffer 76 are each two-port devices having a first section 80, into which video data in the form of a group of frames is written through a first port 82, and a second section 84 from which video data is read through a second port 86, with these writing and reading processes occurring simultaneously. This architecture supports transposition of data access order to support reading lines of pixels in one of pixel order, scan line order, or frame order.

FIG. 7 is a graphical view of data values 90 resulting from sampling adjacent pixels in a typical video sequence, extending along a line in at various distances S. For example, the data values 90 may represent one of the coordinates R, G, B forming a description of the pixel in terms of the intensity of its primary colors—red (R), green (G), and blue (B). Alternately, the data values 90 may represent one of the coordinates Y, U, V in a YUV representation of the pixel color intensity, with Y representing a luminance component, while U and V represent chrominance components. The YUV components are readily derived from the RGB components in a method well known by those skilled in the art of video compression.

The representative sequence of FIG. 7 includes a number of similar or identical pixels providing similar values 92 at a first level, followed first by a step discontinuity 94 and then by a number of similar or identical pixels 96 providing similar or identical values at a second level. The dashed line 98 represents the values returned by a transform process comprising the application of a forward discrete cosine transform (FDCT) to the data from line 90, producing discrete cosine transformation (DCT) coefficients (not shown), and then by the application of an inverse discrete cosine transform (IDCT) to the DCT coefficients to produce data describing the dashed line 98. While this transform process produces data values closely approximating the input data in the regions 92, 96 of constant values or of gradual change, the approximation of the edge discontinuity 94 is characterized by a first ringing artifact 100 occurring before the edge discontinuity 94 and by a second ringing artifact 102 occurring after the edge discontinuity 94. This phenomenon is well known to those skilled in the art as the Gibbs phenomenon, which develops ringing artifacts 100, 102, each having a magnitude equal to approximately nine percent of the magnitude of the edge discontinuity 94.

In terms of a viewable image, the significance of this phenomenon depends on the magnitude of the artifact 100, 102. If the magnitude of the artifact is great enough to allow the artifact to be seen at the edge of adjacent area of identical or gradually changing video data, the artifact will appear as an extra line or shadow at such an edge. However, any system by which video data is displayed has a limited ability to make different levels of such data visually apparent. For example, a video display system is not able to display adjacent pixels as visibly different if their difference is less than a value indicated as δ. Since it is known that the ringing artifact along an edge of an image is nine percent of the difference between values in adjacent pixels across the edge, it is known that the associated ringing artifact will be visible against the similar pixels extending away from the edge when the difference between adjacent pixels in the initial video data is greater than about 11δ. Then, if adjacent areas on opposite sides of an edge of an image differ by less than 11δ, no visible artifacts will be generated and the edge will not be considered a boundary for the purposes of transformation.

FIG. 8 is a graphical view of a pair of dashed lines 104, 106 indicating the values formed by the separate application of this transform process to the regions 92, 96 of, at most, gradual change within the data values 90. The values, indicated by dashed lines 104, 106, resulting from such a separate application of the transform process, closely follow the input values shown in the regions 92, 96.

Therefore, data from pixels within a line of pixels provided for processing by this transform process until an edge formed by a step discontinuity is detected. Such an edge is further defined as a feature sufficient to result in the creation of an artifact having a magnitude sufficient to be seen when the resulting processed image is displayed. Since the magnitude of such an artifact is known to be approximately nine percent of the magnitude of a step discontinuity, the process of supplying pixel data to be transformed is interrupted when the difference in values between adjacent pixels is greater than eleven times the magnitude of the minimally observable difference.

As shown in FIG. 8, the video data comprising sections indicated by dashed lines 104, 106, resulting from the separate application of the transform process to the data regions 92, 96 in FIG. 7 includes a discontinuity that is one pixel wide between the end of the section represented by dashed line 104 and the start of the section represented by dashed line 106

Figure 9:
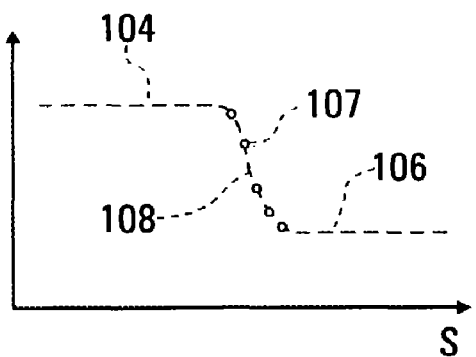
FIG. 9 is a graphical view of a preferred version of the invention, including pixels added by interpolation between the gradually changing regions of FIG. 8.

FIG. 9 is a graphical view showing a preferred version of the invention, in which the sections represented by dashed lines 104, 106 are separated enough to allow space for the insertion of several additional pixels 107 at the pixel spacing of the video data being generated through the transform process. An interpolation function, represented by a dashed line 108, is generated to connect the data represented by dashed lines 104, 106.

The interpolation function is then evaluated at the points of the pixels 107 to determine the coordinate values for these additional pixels. For example, this interpolation function may result in a curved line, as shown, or in the straight line of a linear function. The values of additional pixels 107 inserted in this way may be a function of the magnitude of the difference in the coordinate values of the adjacent end of the segments to which the transform process is separately applied.

Figure 10:
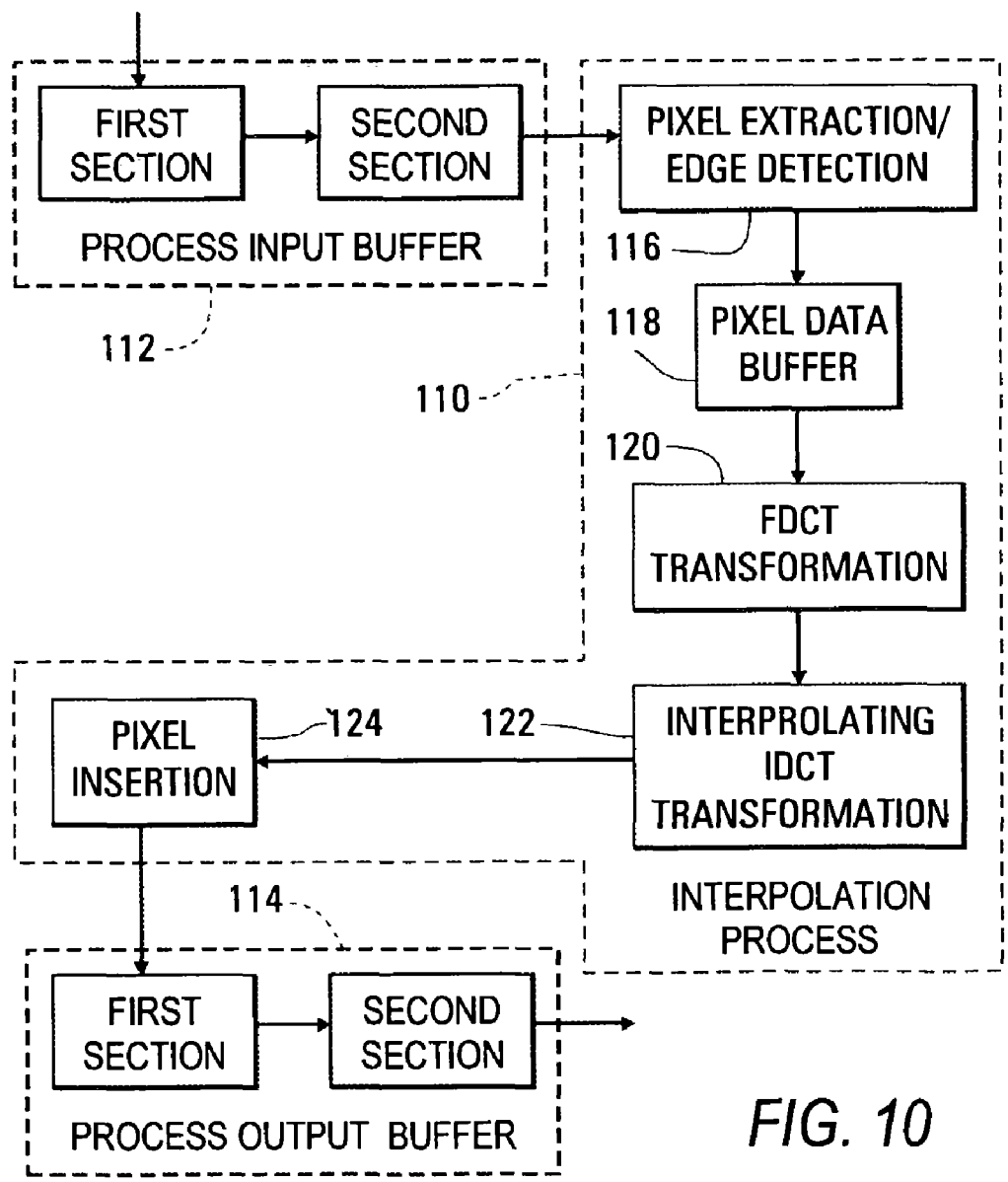
FIG. 10 is a flow chart showing the flow of data through each of the interpolation processes of FIG. 6.

FIG. 10 is a flow chart showing the flow of data through each of the interpolation processes of FIG. 6. That is, the interpolation process 110 of FIG. 10 is the process 52 of interpolation in the pixel direction, the process 62 of interpolation in the scan line direction, or the process 70 of interpolation in the frame direction. Additionally in FIG. 10, the process input buffer 112 is the buffer providing input data to the interpolation process 110, and the process output buffer 114 is the buffer receiving data from the interpolation process 110. For example, if the interpolation process 110 is the process 70 of interpolation in the scan line direction, the process input buffer 112 is the first intermediate buffer 60, and the process output buffer 114 is the second input buffer 68.

Within the interpolation process 110, data from the process input buffer is passed through a pixel extraction and edge detection process 116, in which data from individual pixels extending along the line being examined is extracted and written to a pixel data buffer 118 until an edge is found, with the edge including a change in values sufficient to cause the formation of a visible artifact, as explained above in reference to FIG. 7. When such an edge is found, the process of extracting pixel data for placement in the pixel data buffer is stopped, and the pixel data is provided as an input to an FDCT (forward discrete cosine transform) process 120. The coefficients generated in the FDCT process 120 are provided as inputs to a interpolating IDCT (inverse discrete cosine transform) process 122, which generates pixel data at the desired interpolated coordinate points. This data generated by the interpolating IDCT process 122 is written to the process output buffer 114 by a pixel injection process 124.

It is understood that the interpolation process 110 is applied to a number of "pixel lines," with each "pixel line" being a portion of the data stored in the process input buffer 112 representing a line of pixels to be processed by the interpolation process 110. For interpolation in the pixel direction, the "pixel line" is a line of pixels extending along a scan line in the frame. For interpolation in the scan line direction, the "pixel line" is a line of pixels at corresponding positions in each of the scan lines of the frame, i.e. extending perpendicularly to each of the parallel scan lines. For interpolation in the frame direction, the "pixel line" is a line of pixels at corresponding positions in each of the sequentially adjacent frames within the group of frames among which interpolation is occurring. In each case, since the input frames are finite in size, and since the frames in the group of frames are finite in number, the "pixel line" has a beginning and an end.

Furthermore, in each case, the interpolation is sequentially applied to each of a number of pixel lines. For example, interpolation in the pixel direction is begun with a first pixel line at the top of the first frame in the group of frames and then continued with each next pixel line adjacently below a pixel line for which the process has been completed, through the bottom scan line in the first frame. Then, this process is repeated along each pixel line on each of the succeeding frames in the group of frames. Similarly, interpolation in the scan line direction may be started with a pixel line extending downward, along the left edge of the first frame and then continued with each next pixel line adjacently to the right of a pixel line for which the process has been completed, through the right edge of the first frame. Then, this process is repeated along each pixel line on each of the succeeding frames. Interpolation in the frame direction is, for example, first directed along a pixel line within each succeeding frame in the group of frames in a first position, such as the upper left extreme of the frames. Then the process is repeated for the next pixel line along a line adjacently to the right of the position for which the process has been completed. After the right edge of the frames has been reached, the process is repeated for pixel lines at positions adjacently below the pixels for which the process has been completed. The direction in which adjacent pixels in a pixel line are examined may be reversed between each successive pixel lines, as in a raster pattern, or a direction of pixel examination may be retained between successive pixel lines.

In the case of color pixels, three separate coordinates are required to describe the pixels, with the coordinates being, for example, in the form of the RGB coefficients or alternately in the form of the YUV coefficients. Preferably, the process of interpolation along each pixel line is carried out independently for each of the three coordinates.

Figure 11:
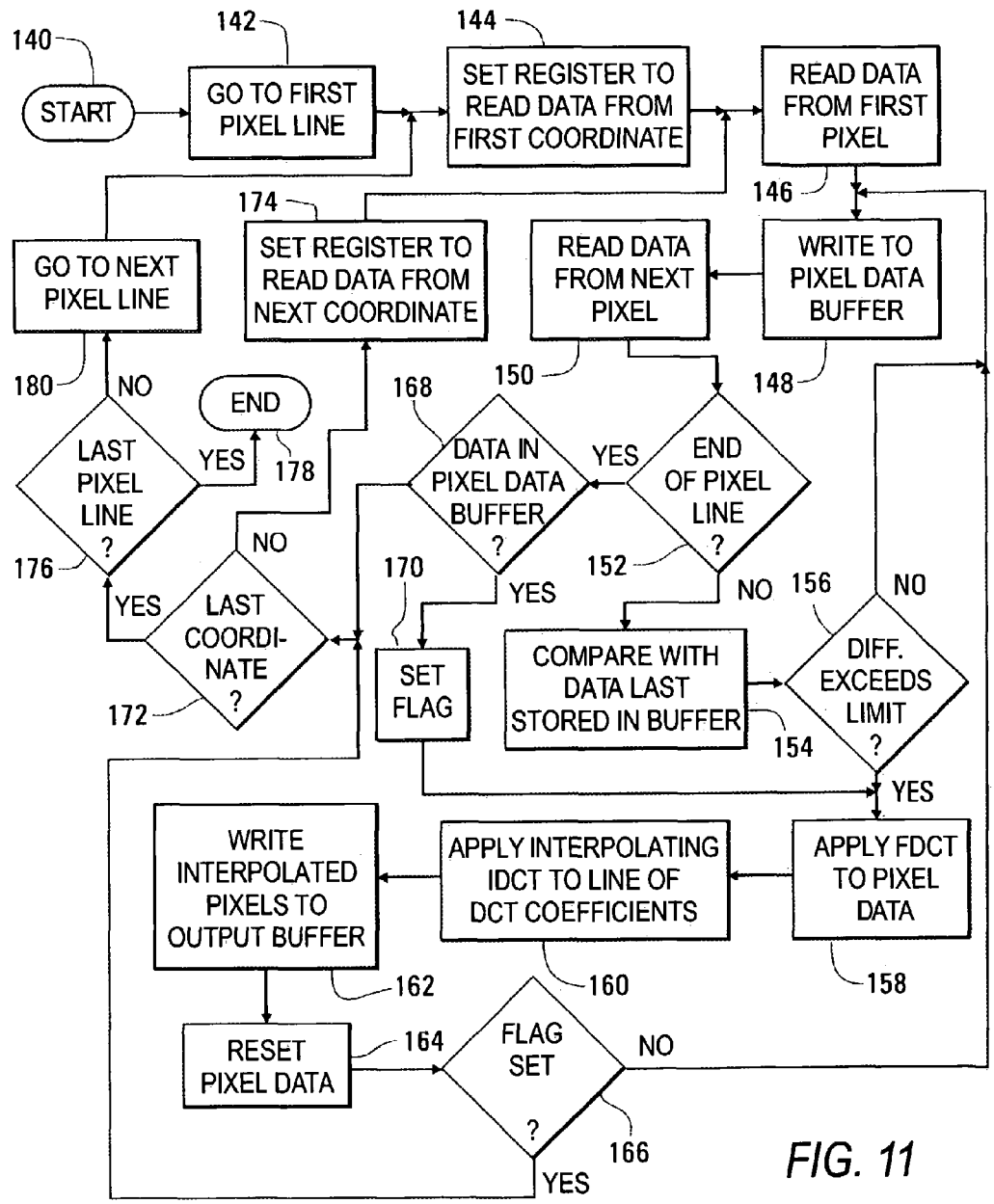
FIG. 11 is a flow chart showing process steps occurring during the interpolation process of FIG. 10.

FIG. 11 is a flow chart showing process steps occurring during the interpolation process 110 of FIG. 10. These process steps are performed, for example, under control of a system processor or a subsystem processor, such as a digital signal processor, executing a program, or they may represent flow through a hardware implementation such as FPGA or ASIC. Note that FIG. 11 represents an example of a particular combination of steps representing the independent transform of each color space within each pixel line, and is not meant to preclude other possible combinations and sequences of operation such as independent storage and processing of color spaces, parallel processing of pixel lines, and continuous accumulation of DCT coefficients in lieu of caching of pixels into memory.

After this interpolation process 110 is begun in step 140, the process proceeds to step 142 to examine the first pixel line. Then, in step 144, the interpolation process 110 sets the contents of a register so that a value of the first of several coordinates, such as the three RGB coordinates or the three YUV coordinates is examined for each pixel. Next, in step 146, the interpolation process 110 reads data, stored in the process input buffer 112, from the first pixel in the pixel line. Then, in step 148, this pixel data is written to the pixel data buffer 118.

From step 148, the interpolation process 110 goes to step 150, in which a data for the next pixel is read from the process input buffer 112. Each time data for a pixel is read in this way, a determination is made in step 152 of whether the end of the pixel line has been reached. For example, such a determination may be based on reading a code for an end of the pixel line instead of pixel data or on determining that additional pixel data is not available for this pixel line within the process input buffer 112. If it is determined in step 152 that the end of the pixel line has not been reached, the interpolation process 110 continues to step 154, in which the pixel data that has just been read is compared with the pixel data most recently stored within the pixel data buffer 118 to determine if the difference between the values is sufficient to cause the appearance of a visible artifact as described above in reference to FIG. 7. For example, if this difference is greater than about eleven times the value that can be visibly seen, such an artifact is expected to occur whether the difference represents an increase or a decrease in the value of the coordinate being considered. If the difference does not exceed a threshold value limit sufficient to cause such an artifact, as determined in step 156, the process of writing pixel data to the pixel data buffer 118 continues with the interpolation process 110 returning to step 148.

On the other hand, if the comparison of step 154 causes a determination to be made in step 156 that this difference exceeds the threshold value limit, so that an artifact will be present if transform process is allowed to continue past this point, the interpolation process 110 proceeds to step 158, in which the FDCT is applied to pixel data stored within the pixel data buffer 118, producing a line of DCT coefficients, to which an interpolating IDCT is applied in step 160. These coefficients may be stored within a buffer before the application of the IDCT, or the IDCT may be applied as the coefficients become available from step 158. Then, as interpolated pixel values become available from step 160, these values are written to the process output buffer 114 in step 162. When these processes have been completed for all of the pixel data stored in the pixel data buffer 118, the contents of this buffer 118 are reset in step 164. Next, in step 166, a determination is made of whether a flag bit has been set to indicate that the end of the pixel line has been reached. If this flag bit has not been set, the interpolation process 110 returns to step 148 to write the cached word of pixel data to the initialized pixel data buffer 118, as described above.

If it is determined in step 152 that the end of the pixel line has been reached, the interpolation process 110 proceeds to step 168, in which it is determined whether data is stored within the pixel data buffer 118. If it is, there is data remaining to form a line segment before proceeding to the next pixel line, a flag bit is set in step 170 to indicate that the end of the pixel line has been reached, and the interpolation process 110 returns to step 158 to apply the FDCT to the data in the pixel data buffer 118. Then, after a determination in step 166 that the flag bit has been set in step 170, the process proceeds to step 172, in which a determination is made of whether the coordinate being considered is the last coordinate to be considered. If it is not the last such coordinate, the interpolation process 110 continues to step 174, in which the contents of the register determining which coordinate is to be considered are reset so that data for the next coordinate will be read. Then, from step 174, the interpolation process 110 returns to step 146 to read the data from the first pixel in the pixel line while considering the new data from the new coordinate.

If it is determined in step 172 that the last of the coordinates has been considered, the interpolation process 110 continues to step 176 to determine if the last pixel line has been considered. If it has, the interpolation process 110 ends in step 178. If the last pixel line has not been considered, the process 110 goes to the next pixel line in step 180 and then returns to step 144 to set the contents of the register so that values for the first coordinate of pixels in the next pixel line will be read.

Figure 12:
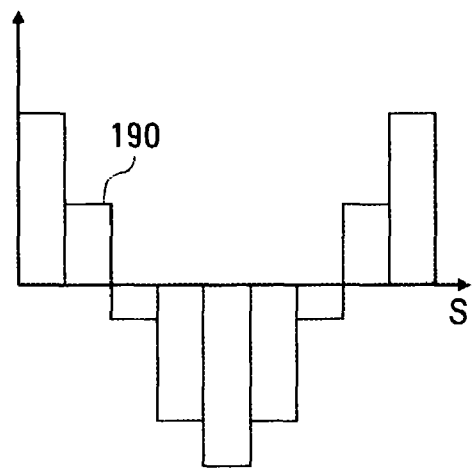
FIG. 12 is a graphical view of values of a coordinate of pixel data provided as an input to the interpolation process of FIG. 10.
Figure 13:
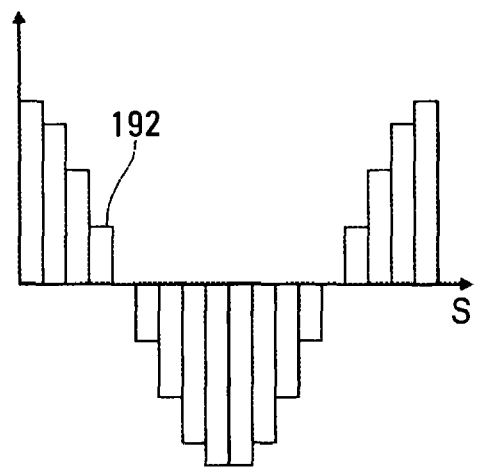
FIG. 13 is a graphical view of pixels generated from the pixel data of FIG. 12 by the interpolation process of FIG. 10.

FIGS. 12 and 13 are graphical views showing the application of the interpolation process 110, described above in reference to FIGS. 9 and 10, to data from a pixel line extending in the direction of a variable S, with FIG. 12 being a graphical view of the values 190 of one of the coordinates of the data for pixels provided as an input to the interpolation process 110, and with FIG. 13 being a graphical view of the values 192 of this coordinate of the data for pixels generated as an output of the interpolation process 110. In the example of FIGS. 12 and 13, the number of pixels in the output data is a multiple of the number of pixels in the input data.

Figure 14:
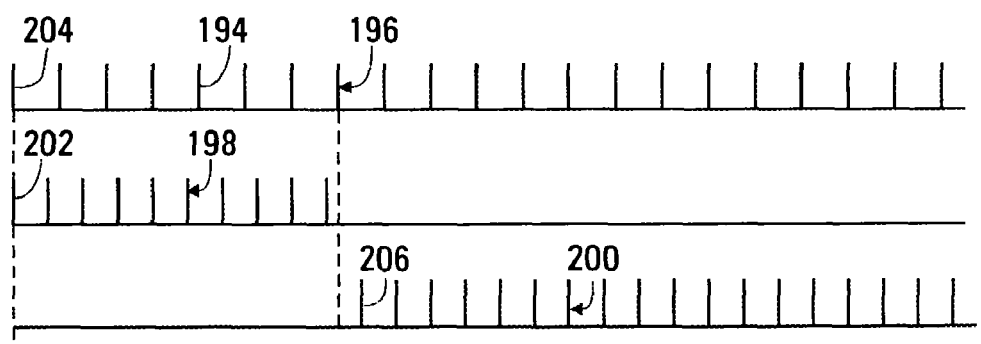
FIG. 14 is a graphical view of pixel locations associated with an application of the interpolation process of FIG. 10, in which the number of pixels in the output data is not a multiple of the number of pixels in the input data.

FIG. 14 is a graphical view of pixel locations associated with a more general application of the interpolation process 110, in which the number of pixels in the output data is not a multiple of the number of pixels in the input data. In the example of FIG. 14, the input data comprises data at pixel locations 194. At the location 196 of a particular pixel, the process of writing pixel data to the pixel data buffer 118, as described above in reference to FIG. 11, is interrupted by a determination in step 156 that the difference between adjacent pixels exceeds the predetermined threshold limit.

The output data from the interpolation process 110 is provided at pixel locations 198 before the interruption at pixel location 196, and at pixel locations 200 after this interruption. In each case the output data from the interpolation process is provided at adjacent pixel locations spaced apart by 0.75 times the spacing, or pitch, of the pixel locations of the input data, so that the number of pixels along the pixel line is increased by one third. The output pixel locations 198 occur with an initial offset of zero, so that the first pixel location 202 of the output pixels is aligned with the first pixel location 204 of the input pixels. However, the pixel locations 200 are offset from the pixel locations of the input pixels through a distance of 0.25 times the pitch of the input pixel data, so that the first pixel location 206 is 0.50 times this pitch beyond the preceding pixel location 196 of the input pixels.

Thus, the interpolation process 110 preferably tracks this offset distance as it is applied to new groups of pixel data whenever the pitch of the output pixel data is not a multiple of the pitch of the input pixel data. This process is applied, as shown in FIG. 14, to increase the number of pixels along a pixel line through up-sampling, or alternatively to decrease the number of pixels along a pixel line through down-sampling.

Using the DCT in accordance with the method of the invention has the advantage over prior-art methods in that the representation of data mirrors the statistical behavior of video data. This means that the interpolated data is that which, on the average, would have been present in typical video images. The synthesized higher-resolution image is therefore more accurate than that of any other filter.

The DCT method of the invention is equally applicable to interpolation in the time dimension. When used to convert interlaced video to progressive scan, or to convert between different frame rates, the DCT correctly interpolates the activity of moving objects, and can replace the far more computationally complex and less reliable motion estimation techniques in use today. The current invention capitalizes on the advantages of the DCT to perform visually compelling format conversions between video formats.

While the interpolation process of the invention has been described as being applied to change both the resolution of individual frames in horizontal and vertical directions and to change the frame rate at which individual frames are presented, it is understood that this interpolation process may be applied to individual frames, one at a time, to change the resolution or format of the frames in either of both horizontal and vertical directions, and that the process may alternately be applied to groups of frames to change the frame rate without being applied to change the resolution.

While the above discussion has been focused on the use of the DCT function and its inverse, it is understood that the DCT function is an example of a decorrelating function that, in its application to the coordinate values of a sequence of pixels, removes the statistical correlation between adjacent pixels within the sequence. (In this context, a sequence of pixels is understood to extend in a line in the scan line direction, perpendicular to the scan line along an individual frame, or among pixels of sequential frames, with the sequential pixels having the same scan line and pixel location on the scan line.) This decorrelating property of the DCT function is important because if allows video data to be constructed at a new pixel spacing by evaluating the inverse function (IDCT) applied to a transform function generated using the DCT at locations corresponding to the new pixel spacing without a generation of visible artifacts during the evaluation process. Other examples, known to those skilled in the art, of functions having this decorrelating property, which can alternately be used in the present invention, are the Karhunen-Loeve Transform (KLT), Slant Transform (ST), the C-Matrix Transform (CMT), the Discrete Legendere Transform (DLT), the Discrete Fourier Transform (DFT), the Walsh-Hadamar Transform (WHT), and the Discrete Sine Transform (DST). Of these functions, the KLT generates discrete data, which cannot be used directly for interpolation. However, a least-squares fit of such discrete data may be generated using a curve-fitting algorithm, with the evaluation necessary for interpolation then being performed on the equation generated by the least-squares fit.

The above discussion in reference to FIGS. 7–9 has described a method of the invention for applying the DCT and IDCT to separate sequences of pixel data, with the separate sequences being determined according to the presence of visible discontinuities. An alternate version of the invention will now be described with references being made to FIGS. 15–17. In accordance with this alternative version, the input pixel sequence is modified to eliminate the generation of certain artifacts before the transform process is applied. Then the transform process is applied to the modified pixel sequence. Next, an inverse of the process of modification is applied to the transformed pixel sequence.

Figure 15:
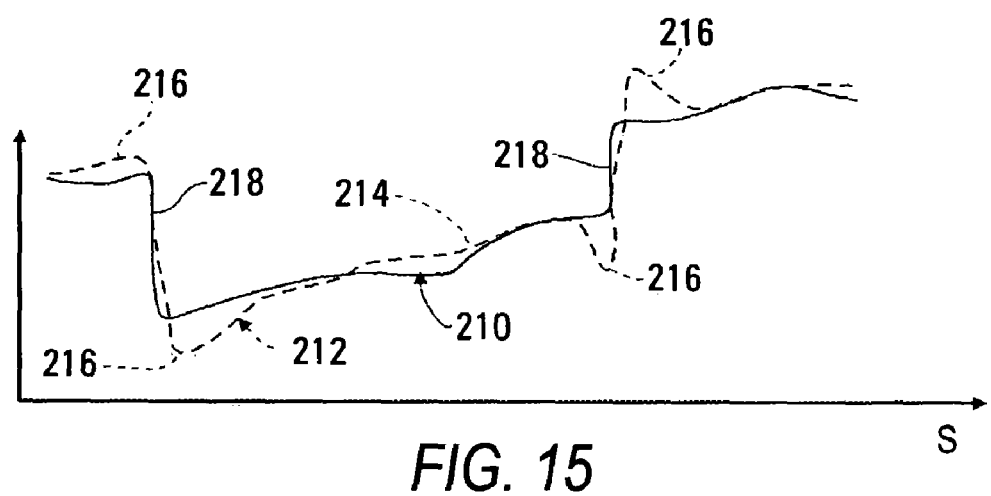
FIG. 15 is a graphical view of an input function describing coordinate values of a pixel sequence, together with a transformed function formed by applying a transform process to this input function.

FIG. 15 is a graphical view of a function 210 describing the coordinate values of an input pixel sequence to which this alternate version of the invention is to be applied. When the transform process is applied to this function, a transformed function 212 is generated, including segments 214 closely following the original function 210 in areas of gradual change and ringing artifacts 216 at discontinuities 218 within the function 210. Therefore, the transform process is not applied to the function 210 in the manner of FIG. 15.

Figure 16:
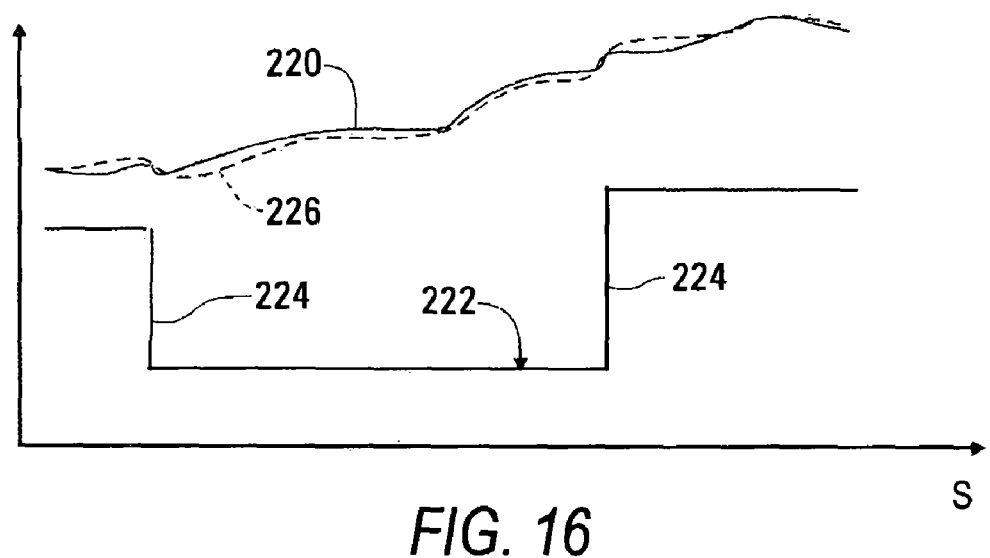
FIG. 16 is a graphical view of intermediate functions formed in accordance with the second version of the invention.

FIG. 16 is a graphical view of a function 220 formed by modifying the input function 210 in accordance with the alternate version of the invention. The process of forming the function 220 is begun by examining the function 210 to determine the locations and magnitudes of discontinuities 218. When such discontinuities 218 are determined to be large enough to cause the formation of visible ringing artifacts, as described in detail above in reference to FIG. 7, a leveling function 222 is generated, having steps 224 at locations corresponding to those discontinuities of sufficient magnitude to cause the formation of ringing artifacts. Each of these steps 224 has a magnitude sufficient to remove the corresponding discontinuity 218 when the leveling function 222 is subtracted from the original function 210, generating the modified function 220 lacking the discontinuities 218. Then, the transform process is applied to the modified function 220 to produce an intermediate transformed function 226 that closely follows the shape of the modified function 220.

Figure 17:
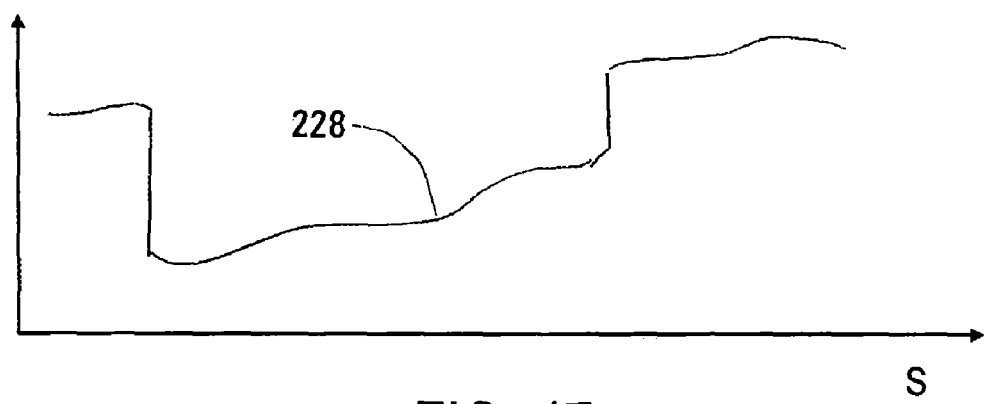
FIG. 17 is a graphical view of an output function formed in accordance with the second version of the invention.

FIG. 17 is a graphical view of and output transform function 228, having the desired pixel spacing resulting from the transform process, which closely follows the shape of the input function 210. This output transform function 228 is formed by adding the leveling function 222 to the intermediate transformed function 226.

Although this invention has been described in its preferred versions with a certain degree of particularity, it is to be understood that the present disclosure has been made by way of example only and that one may resort to numerous changes to the versions described herein without departing from the spirit and scope of the invention as hereinafter set fort.

What is claimed is:

1. A method for converting initial digital video data having a format including an input sequence of pixels extending in a first direction at a first spacing into output digital video data having a format including an output sequence of pixels extending in said first direction at a second spacing, different from said first spacing, wherein said method comprises:

transforming coordinate values of a first sequence of pixels within said input sequence of pixels into a first transformation function by applying a decorrelating transform to said coordinate values of said first sequence of pixels, wherein applying said decorrelating transform to said coordinate values of said first sequence of pixels removes a statistical correlation between coordinate values of sequentially adjacent pixels within said first sequence of pixels; and determining coordinate values for generating a second sequence of pixels forming a portion of said output sequence of pixels by evaluating, at locations of pixels sequentially adjacent in said first direction at said second spacing, a function formed by applying an inverse of said decorrelating transform to said first transformation function.

2. The method of claim 1, wherein said first direction is along a scan line along a frame within said initial digital video data.

3. The method of claim 1, wherein said first direction is perpendicular to a scan line along a frame within said initial digital video data.

4. The method of claim 1, wherein said first direction extends among sequentially adjacent frames within said initial digital video data.

5. The method of claim 1, wherein said decorrelating transform is a discrete cosine transform.

6. The method of claim 1, additionally comprising:

separating said input sequence of pixels into said first sequence of pixels and an additional sequence of pixels at a location corresponding to a visible discontinuity within said input sequence of pixels;

transforming coordinate values of said additional sequence of pixels into a second transformation function by applying said decorrelating transform to said coordinate values of said additional sequence of pixels; and determining coordinate values for a third sequence of pixels forming a portion of said output sequence of pixels by evaluating, at locations of pixels sequentially adjacent in said first direction at said second spacing, a function formed by applying an inverse of said decorrelating transform to said additional transformation function.

7. The method of claim 6, wherein said location corresponding to a visible discontinuity is determined to occur at a location of adjacent pixels having a difference in a coordinate value greater than eleven times a magnitude of a difference in said coordinate value causing a visible difference between said adjacent pixels.

8. The method of claim 6, additionally comprising:

generating an interpolation function extending between coordinate values at adjacent ends of said second and third sequences of pixels; and determining coordinate values for generating a sequence of pixels to extend within said output sequence of pixels between said second and third sequences of pixels.

9. The method of claim 1, additionally comprising locating a visible discontinuity within said input sequence of pixels;

generating a leveling function to subtract from coordinate values of said input sequence of pixels to remove said visible discontinuity;

subtracting said leveling function from coordinate values of said input sequence of pixels to form said coordinate values of said first sequence of pixels; and adding said leveling function to said coordinate values determined by evaluating said function formed by applying an inverse to said decorrelating transform to said first transformation function.

10. The method of claim 9, wherein said visible discontinuity is determined to occur at a location of adjacent pixels having a difference in a coordinate value greater than eleven times a magnitude of a difference in said coordinate value causing a visible difference between said adjacent pixels.

11. A method for converting a sequence of initial digital video frames having a format including a first frame spacing to a sequence of output digital video frames having a format including a second frame spacing, different from said first frame spacing, wherein each of said initial digital video frames includes a plurality of lines, and wherein each of said lines includes a plurality of pixel positions, and wherein said method comprises, for an input sequence of pixels extending through said sequence of initial digital video frames at each of said pixel positions in each of said lines, performing the following steps, performing the following steps:

transforming coordinate values of a first sequence of pixels within said input sequence of pixels into a first transformation function by applying a decorrelating transform to said coordinate values of said first sequence of pixels, wherein applying said decorrelating transform to said coordinate values of said first sequence of pixels removes a statistical correlation between coordinate values of sequentially adjacent pixels within said first sequence of pixels; and determining coordinate values for generating a second sequence of pixels forming a portion of an output sequence of pixels by evaluating, at locations of pixels sequentially adjacent at said second frame spacing, a function formed by applying an inverse of said decorrelating transform to said first transformation function.

12. The method of claim 11, additionally comprising:
determining locations of visible discontinuities in each said input sequence of pixels;
at each location of one of said visible discontinuities, separating said input sequence of pixels into an additional sequence of pixels;
transforming coordinate values of each said additional sequence of pixels into a second transformation function by applying said decorrelating transform to said coordinate values of said additional sequence of pixels; and
determining coordinate values for a third sequence of pixels forming a portion of said output sequence of pixels by evaluating, at locations of pixels sequentially adjacent in said first direction at said second spacing, a function formed by applying an inverse of said decorrelating transform to said additional transformation function.

13. The method of claim 11, additionally comprising
determining locations of visible discontinuities in said input sequences of pixels;
generating a leveling function to subtract from coordinate values of said input sequence of pixels to remove each of said visible discontinuities;
subtracting said leveling function from coordinate values of said input sequence of pixels to form said coordinate values of said first sequence of pixels; and
adding said leveling function to said coordinate values determined by evaluating said function formed by applying an inverse to said decorrelating transform to said first transformation function.

14. A method for converting a sequence of initial digital video frames having an initial format into a sequence of output digital video frames having an output format, different from said initial format, wherein said initial format includes a first pixel spacing between adjacent pixels along scan lines, a first line spacing between adjacent scan lines, and a first frame spacing between adjacent frames, wherein said output format includes a second pixel spacing between adjacent pixels along scan lines, a second line spacing between adjacent scan lines, and a second frame spacing between adjacent frames, and wherein said method comprises, for an input sequence of pixels extending along each scan line in each frame within said initial digital video frames:
transforming coordinate values of a first sequence of pixels within said input sequence of pixels into a first transformation function by applying a decorrelating transform to said coordinate values of said first sequence of pixels, wherein applying said decorrelating transform to said coordinate values of said first sequence of pixels removes a statistical correlation between coordinate values of sequentially adjacent pixels within said first sequence of pixels;
determining coordinate values by evaluating, at locations of pixels sequentially adjacent at said second pixel spacing, a function formed by applying an inverse of said decorrelating transform to said first transformation function; and
generating a first intermediate sequence of digital video data including scan lines generated using said coordinate values determined by evaluating said function formed by applying an inverse of said decorrelating transform to said first transformation function.

15. The method of claim 14, additionally comprising:
determining locations of visible discontinuities in each said input sequence of pixels;
at each location of one of said visible discontinuities, separating said input sequence of pixels into an additional sequence of pixels;
transforming coordinate values of each said additional sequence of pixels into an additional transformation function by applying said decorrelating transform to said coordinate values of said additional sequence of pixels; and
determining coordinate values for a third sequence of pixels forming a portion of said first intermediate sequence of video data by evaluating, at locations of pixels sequentially adjacent in along said scan line at said second pixel spacing, a function formed by applying an inverse of said decorrelating transform to said additional transformation function.

16. The method of claim 14, additionally comprising
determining locations of visible discontinuities in each said input sequence of pixels;
generating a leveling function to subtract from coordinate values of said input sequence of pixels to remove each of said visible discontinuities;
subtracting said leveling function from coordinate values of said input sequence of pixels to form said coordinate values of said first sequence of pixels; and
adding said leveling function to said coordinate values determined by evaluating said function formed by applying an inverse to said decorrelating transform to said first transformation function.

17. The method of claim 14, additionally comprising for an input sequence of pixels extending from each pixel position along a scan line in a direction perpendicular to said scan line through each scan line in each frame within said first intermediate sequence of digital video data:
transforming coordinate values of a second sequence of pixels within said input sequence of pixels into a second transformation function by applying a decorrelating transform to said coordinate values of said first sequence of pixels, wherein applying said decorrelating transform to said coordinate values of said first sequence of pixels removes a statistical correlation between coordinate values of sequentially adjacent pixels within said first sequence of pixels;
determining coordinate values by evaluating, at locations of pixels sequentially adjacent at said second pixel spacing, a function formed by applying an inverse of said decorrelating transform to said second transformation function; and
generating a second intermediate sequence of digital video data including pixels generated using said coordinate values determined by evaluating said function formed by applying an inverse of said decorrelating transform to said second transformation function.

18. The method of claim 17, additionally comprising:
determining locations of visible discontinuities in each said input sequence of pixels;
at each location of one of said visible discontinuities, separating said input sequence of pixels into an additional sequence of pixels;
transforming coordinate values of each said additional sequence of pixels into an additional transformation function by applying said decorrelating transform to said coordinate values of said additional sequence of pixels; and determining coordinate values for a third sequence of pixels forming a portion of said second intermediate sequence of digital video data by evaluating, at locations of pixels sequentially adjacent in along said input sequence of pixels at said second pixel spacing, a function formed by applying an inverse of said decorrelating transform to said additional transformation function.

19. The method of claim 17, additionally comprising determining locations of visible discontinuities in each said input sequence of pixels;

generating a leveling function to subtract from coordinate values of said input sequence of pixels to remove each of said visible discontinuities;

subtracting said leveling function from coordinate values of said input sequence of pixels to form said coordinate values of said second sequence of pixels; and adding said leveling function to said coordinate values determined by evaluating said function formed by applying an inverse to said decorrelating transform to said first transformation function.

20. The method of claim 17, additionally comprising for an input sequence of pixels extending from each pixel position along a scan line in a direction perpendicular to a frame within said second intermediate sequence of digital video data, said input sequence of pixels extending through each frame within said second intermediate sequence of digital video data:

transforming coordinate values of a third sequence of pixels within said input sequence of pixels into a third transformation function by applying a decorrelating transform to said coordinate values of said first sequence of pixels, wherein applying said decorrelating transform to said coordinate values of said first sequence of pixels removes a statistical correlation between coordinate values of sequentially adjacent pixels within said first sequence of pixels;

determining coordinate values by evaluating, at locations of pixels sequentially adjacent at said second frame spacing, a function formed by applying an inverse of said decorrelating transform to said third transformation function; and generating said sequence of output digital video frames including pixels generated from said coordinate values determined by evaluating said function formed by applying an inverse of said decorrelating transform to said third transformation function.

21. The method of claim 20, additionally comprising:

determining locations of visible discontinuities in each said input sequence of pixels;

at each location of one of said visible discontinuities, separating said input sequence of pixels into an additional sequence of pixels;

transforming coordinate values of each said additional sequence of pixels into an additional transformation function by applying said decorrelating transform to said coordinate values of said additional sequence of pixels; and determining coordinate values for a third sequence of pixels forming a portion of said sequence of output digital video frames by evaluating, at locations of pixels sequentially adjacent in along said input sequence of pixels at said second frame spacing, a function formed by applying an inverse of said decorrelating transform to said additional transformation function.

22. The method of claim 20, additionally comprising determining locations of visible discontinuities in each said input sequence of pixels;

generating a leveling function to subtract from coordinate values of said input sequence of pixels to remove each of said visible discontinuities;

subtracting said leveling function from coordinate values of said input sequence of pixels to form said coordinate values of said third sequence of pixels; and adding said leveling function to said coordinate values determined by evaluating said function formed by applying an inverse to said decorrelating transform to said first transformation function.

* * * * *